July 30, 1963   A. J. MONTCHAUSSE ETAL   3,099,085
RELAY-CONTACT CUTTING TOOL
Filed Dec. 4, 1961   3 Sheets-Sheet 1

*Inventor*
A. J. MONTCHAUSSE
R. P. LeCOMTE
By
Paul W. Hemminger
*Attorney*

United States Patent Office 3,099,085
Patented July 30, 1963

3,099,085
RELAY-CONTACT CUTTING TOOL
Andre Jean Montchausse, Paris, and Robert Pierre Lecomte, Nanterre, France, assignors to International Standard Electric Corporation, New York, N.Y., a corporation of Delaware
Filed Dec. 4, 1961, Ser. No. 156,727
Claims priority, application France Dec. 15, 1960
7 Claims. (Cl. 30—124)

This invention relates to a relay-contact cutting tool for removing contact points from relay contact springs. Its principal object is to provide a simple and reliable tool of the above character which permits contact cutting operations without the necessity of disassembling the relay structure.

In apparatus containing relays, a defective contact in a relay contact assembly necessitated removing the relay from its mounting, disconnecting the associated wiring, and disassembling the contact stackup before repairs could be made. Thereafter, a new adjustment was required on the re-assembled relay before replacing it into operation. These repair operations were tedious and time consuming.

Prior-art arrangements are known using a type of pliers which grip the contact spring by one pair of jaws and cut the contact from its contact spring by a third movable part. Such tools are large and bulky since they necessitate exertion of force in two different directions perpendicular to one another. Such a tool is thus unwieldy and cannot be used in numerous contact assemblies wherein the contact springs are spaced close together.

According to the present invention, the foregoing disadvantages are overcome by providing a double-jaw contact cutting tool which uses the same jaws for both gripping and cutting operations. The single pair of jaws in the inventive arrangement readily permit a tool which has slender extremities for insertion between closely spaced contact springs.

An object of the invention is to provide a two-jaw contact cutting tool in which one jaw is fixed and a second jaw is movable, first by rotating movement into gripping relation with the fixed jaw and then into a sliding movement with respect to the fixed jaw while maintaining the noted gripping action.

Another object is to provide a lever arm pivotably mounted on the fixed jaw and mechanically linked to the movable jaw to perform the noted gripping and cutting operations and to obtain a mechanical advantage to reduce the force required for operating the tool.

Another object is to mechanically link the lever arm to the movable jaw so that partial movement of the lever arm causes the movable jaw to grip and distort so that further movement of the lever arm maintains the movable jaw distorted in gripping relationship and slides to perform the cutting operation.

Another object is to provide recesses in the ends of the fixed jaw while provides an abutment for the end of the contact spring to prevent slippage during cutting operations.

Other objects and features will become apparent and the invention will be best understood when the specification is read in conjunction with the accompanying drawings comprising FIGS. 1 to 7 wherein.

Figure 1:
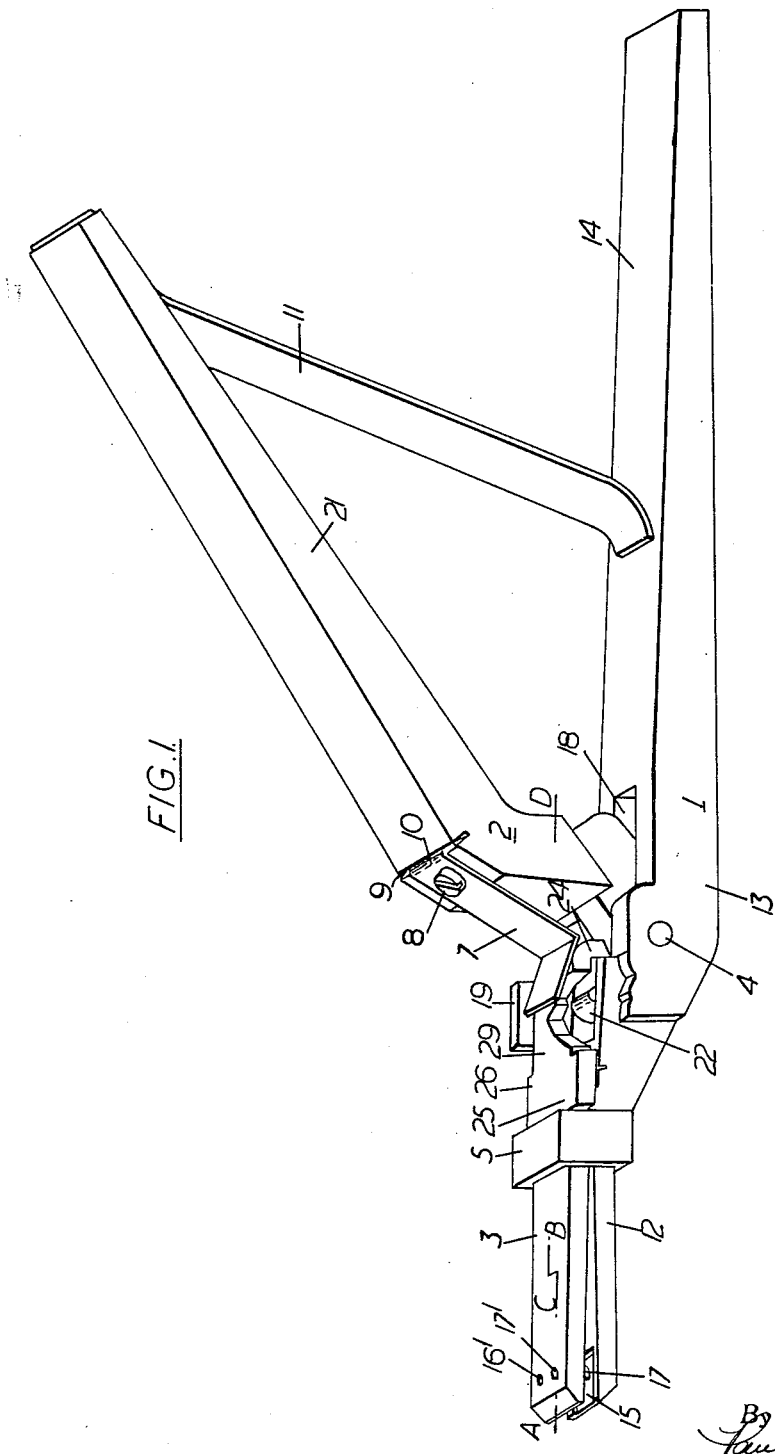
FIG. 1 shows a perspective view of a cutting tool constructed according to the invention.
Figure 2:
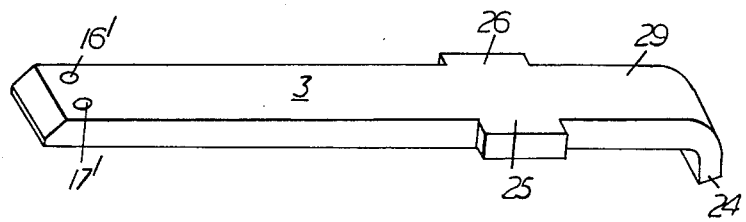
FIGS. 2 to 4 show perspective views of the upper movable jaw; the camming portion of the handle assembly; and the lower stationary jaw, respectively of the tool of FIG. 1.
Figure 3:
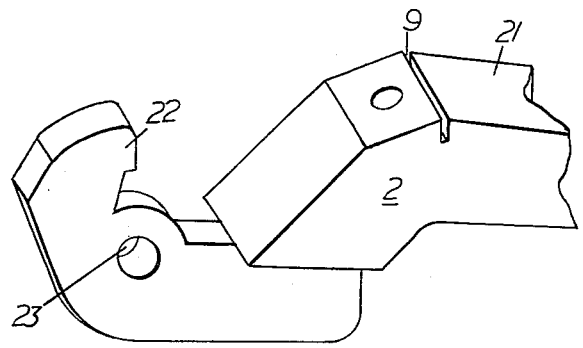
Figure 4:
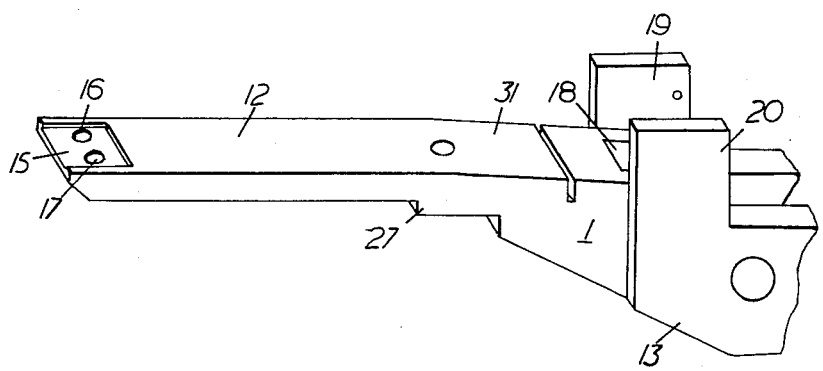

The tool in FIG. 1 comprises three main parts, 1, 2 and 3. Part 1 comprises a jaw 12, a central portion 13 and a handle 14. Part 2 comprises a handle 21 and a cam 22. Part 3 is made of spring material and comprises an intermediate portion 29 and a heel 24.

Part 1 also includes a holding ring 5, secured thereto by screw 6. Part 2 includes an L-shaped spring 7 secured thereto by screw 8. The end 10 of spring 7 engages a slot in part 1 to prevent spring slippage. Part 2 also includes a spring 11 which is secured thereto by any suitable means and arranged to abut against part 1 to maintain the tool jaws in open condition.

Part 3 is slidingly maintained on part 1 by ring 5. A spring 30 is placed between the contacting point of parts 1 and 3 as a pivot point. Spring 30 has one end inserted in a slot in part 1 to prevent its lateral movement. Part 2 is secured to part 1 by pivot screw 4 with the cam portion 22 abuting portion 29 of part 3. The spring 7 maintains the intermediate portion 29 of part 3 against the cam 22 and spring 30 maintains part 3 against ring 5. Spring 30 acts as a pivot point for part 3 which has the cutting end slightly open from the pressure exerted by spring 7. Shoulders 25 and 26 insure proper longitudinal alignment of parts 1 and 3.

Two cylindrical openings 16 and 17 and 16' and 17' are provided in the ends of parts 1 and 3 and are spaced to fit over the contacts of the contact spring.

It is obvious that the shape, the depth, the size of hollow 15 and opening 16 and 17 are determined according to the type of contact spring for which the tool was designed. Likewise, in the described example, the application of the tool has been considered for twin-contact springs which are now currently used. However, the tool could be designed for the cutting of a single contact at a time on a twin-contact spring or on a single contact spring, or for the use on springs or contacts of different shape, thickness and size without departing from the scope of the invention.

Figure 5:
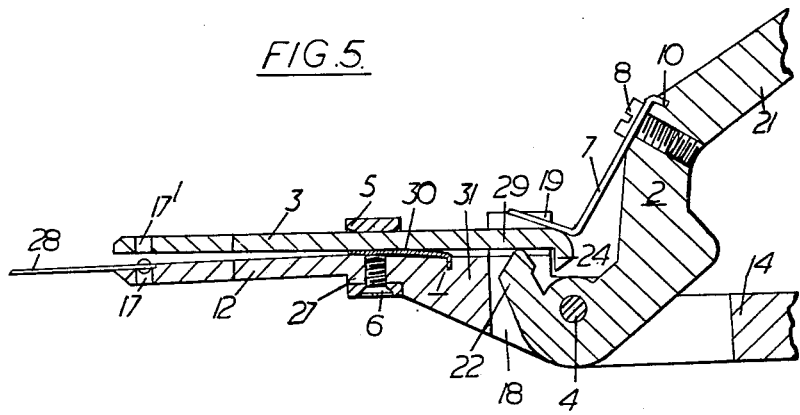
FIGS. 5 to 7 taken along lines ABCD of FIG. 1, show partial views of the tool of FIG. 1 in an unoperated position; an intermediate operating position; and a fully operated position, respectively.
Figure 6:
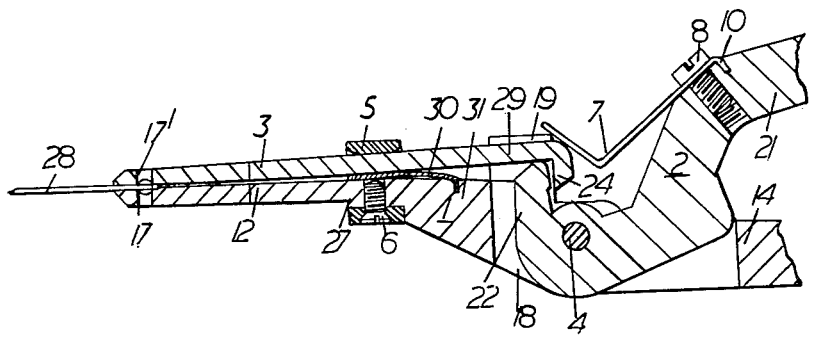
Figure 7:
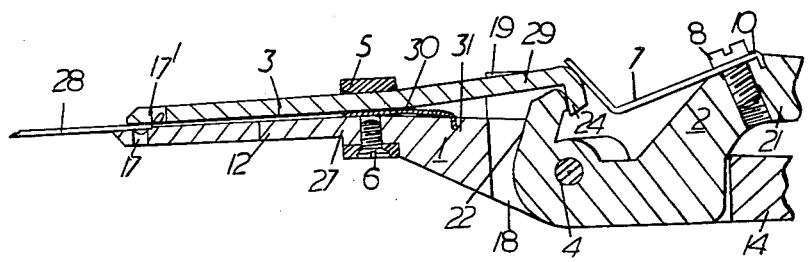

Referring now to FIGS. 5 to 7, the operation of the tool will be described. Spring 28 represents a spring which has contacts to be removed. Jaws 3 and 12 are placed on both sides of spring 28 with the contacts thereof fitting into openings 16, 17, 16' and 17'. The movement of lever arm 21 towards part 1 turns cam 22 clockwise and lifts portion 29 of jaw 3 which pivots about the support at ring 5. The free end of jaw 3 lowers and grips the contact spring 28. Continued movement of lever arm 21 causes jaw 3 to become elastically distorted.

When the extremity of cam 22 engages heel 24 of jaw 3, jaw 3 is slid along section 12. At this time jaw 12 remains distorted under ring 5 and maintains a gripping force. The sharp edges of the holes 16' and 17' cut the upper contacts. The abutment 15 prevents contact spring 28 from moving.

The lever arm is then released and it is restored to normal position by spring 11. The tool then may be turned over and the lower contacts on contact spring 28 may be cut.

While the principles of the invention have been described above in connection with specific apparatus and applications, it is to be understood that this description is made only by way of example and not as a limitation on the scope of the invention.

We claim:

1. A cutting tool for removing electrical contacts from contact springs comprising fixed jaw means and movable jaw means, said movable jaw means including apertures at one end thereof for encompassing the contacts to be cut and including shoulder means at the other end, retaining means for maintaining said movable jaw means intermediate its ends to the said fixed jaw means for rotational movement and sliding movement with respect to the fixed jaw means, and actuating means associated with said shoulder means for rotating said movable jaw means into gripping relation with said fixed jaw means and for laterally moving said movable jaw means with respect to said fixed jaw means.

2. In a cutting tool as set forth in claim 1, the said actuating including means for maintaining said movable jaw means in its said rotated position during its said lateral movement.

3. A cutting tool as set forth in claim 2 wherein said movable jaw means possess spring characteristics and wherein said actuating means rotates the end of the movable jaw means containing the said apertures through an angle greater than the end of the movable jaw means including the said shoulder means to spring distort said movable jaw means.

4. A cutting tool as set forth in claim 1 wherein said movable jaw means comprises an L-shaped structure with the shorter right angle portion thereof defining said shoulder means and wherein said actuating means comprises an L-shaped structure with the shorter right angle portion thereof disposed in abutting relation with said shoulder means.

5. In a cutting tool as set forth in claim 4, means for securing said actuating means for the rotation of the right angle portion thereof into abutting relation with the movable jaw means at a point intermediate said retaining means and said shoulder means and further rotation into abutting relation with said shoulder means.

6. In a cutting tool as set forth in claim 1, cutout means defining a slot in the end of the movable jaw means including the said apertures for receiving the contact spring containing the contacts to be sheared, said cutout means having a depth less than the thickness of the said contact spring to insure the complete cutting of contacts.

7. In a cutting tool as set forth in claim 1, spring means associated with actuating means for returning said movable jaw means to normal position after each cutting operation.

References Cited in the file of this patent
UNITED STATES PATENTS

| | | |
|---|---|---|
| 2,595,145 | Jensen | Apr. 29, 1952 |
| 2,820,292 | Bouten et al. | Jan. 21, 1958 |